US007120409B2

(12) United States Patent
Fujihashi et al.

(10) Patent No.: US 7,120,409 B2
(45) Date of Patent: Oct. 10, 2006

(54) HIGH FREQUENCY MODULE AND RADIO DEVICE USING THE SAME

(75) Inventors: Yoshikuni Fujihashi, Hyogo (JP); Hiroki Iwamiya, Osaka (JP); Yuji Osumi, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 221 days.

(21) Appl. No.: 10/491,127

(22) PCT Filed: Jul. 23, 2003

(86) PCT No.: PCT/JP03/09312

§ 371 (c)(1), (2), (4) Date: Mar. 29, 2004

(87) PCT Pub. No.: WO2004/012351

PCT Pub. Date: Feb. 5, 2004

(65) Prior Publication Data

US 2005/0003779 A1 Jan. 6, 2005

(30) Foreign Application Priority Data

Jul. 31, 2002 (JP) ............................ 2002-222788

(51) Int. Cl.
*H04B 1/10* (2006.01)
*H04B 15/06* (2006.01)

(52) U.S. Cl. ...................... 455/222; 455/307; 455/323

(58) Field of Classification Search ................ 455/130, 455/208, 190.1, 226.1, 252.1, 255, 283, 278.1, 455/307, 300, 323, 222; 333/32, 202
See application file for complete search history.

(56) References Cited

U.S. PATENT DOCUMENTS

| | | | | |
|---|---|---|---|---|
| 4,661,998 | A | 4/1987 | Yamashita et al. | |
| 6,016,090 | A * | 1/2000 | Iio et al. | 333/202 |
| 6,198,367 | B1 * | 3/2001 | Matsunaga et al. | 333/246 |
| 6,369,676 | B1 * | 4/2002 | Sakamoto et al. | 333/219.1 |
| 6,740,953 | B1 * | 5/2004 | Tanabe | 257/499 |
| 6,794,961 | B1 * | 9/2004 | Nagaishi et al. | 333/247 |
| 6,815,796 | B1 * | 11/2004 | Ota et al. | 257/528 |
| 6,891,452 | B1 * | 5/2005 | Mikami et al. | 333/219 |
| 6,911,882 | B1 * | 6/2005 | Haruta et al. | 333/235 |
| 6,980,066 | B1 * | 12/2005 | Nakai et al. | 333/128 |
| 2003/0232611 | A1 * | 12/2003 | Vasa | 455/307 |
| 2003/0234695 | A1 * | 12/2003 | Haruta et al. | 331/68 |

FOREIGN PATENT DOCUMENTS

| | | |
|---|---|---|
| JP | 57-200944 | 12/1982 |
| JP | 58-204627 | 11/1983 |
| JP | 4-2223 | 1/1992 |
| JP | 9-270828 | 10/1997 |
| JP | 10-285060 | 10/1998 |
| JP | 2001-218120 A | 8/2001 |
| JP | 2002-43805 A | 2/2002 |

* cited by examiner

*Primary Examiner*—Sonny Trinh
(74) *Attorney, Agent, or Firm*—McDermott Will & Emery LLP

(57) ABSTRACT

The high-frequency module of the present invention is formed of two sections: first high-frequency circuit 5 having a first filter circuit; and second high-frequency circuit 6 having a second filter circuit. At least any one of the two high-frequency circuits has a conductive case. The structure is highly effective in attenuating a spurious signal, thereby solving the problem that the output level of the spurious signal fed from the high-frequency module is undesirably increased.

8 Claims, 5 Drawing Sheets

HIGH FREQUENCY MODULE AND RADIO DEVICE USING THE SAME

TECHNICAL FIELD

The present invention relates to a high-frequency module employed for mobile communications and a wireless device using the high-frequency module.

BACKGROUND ART

In a high-frequency circuit, a spurious signal generated in a mixing circuit and a matching circuit is removed by a filter circuit. Such a high-frequency circuit has conventionally been configured as a single module. FIG. 6 shows a conventional high-frequency module. In the conventional high-frequency circuit block, mixing circuit 12 mixes a baseband signal fed from baseband section 31 with a local signal fed from oscillator 41. A spurious signal produced by mixing circuit 12 is attenuated by first filter 13 and second filter 22 of filter circuit 18. A desired high-frequency signal has thus been obtained.

In the prior-art high-frequency module, however, due to the structure configured in one module, a spurious signal produced by matching device 14 connected to the input side of first filter 13 directly goes, without passing through first filter 13, matching device 17, and second filter 22, into matching device 24. In the module, matching device 17 is connected to the output side of first filter 13 and the input side of second filter 22, and matching device 24 is located to the output side of second filter 22.

Therefore, in matching device 24, the spurious signal directly come from matching device 14 has an output level greater than that of the spurious signal given attenuation by first filter 13 and second filter 22, accordingly, the resultant spurious signal cannot maintain a desirable attenuation level. As a result, the output level of the spurious signal fed from the high-frequency module has undesirably increased.

DISCLOSURE OF THE INVENTION

The present invention addresses the problem above. It is therefore the object to provide a high-frequency module capable of offering a spurious signal with a preferably suppressed output level.

To achieve the object, the structure of the present invention has the high-frequency circuit formed of two sections: the first high-frequency circuit having a first filter circuit, and the second high-frequency circuit having a second filter circuit.

DETAILED DESCRIPTION OF CARRYING OUT OF THE INVENTION

An exemplary embodiment of the present invention is described hereinafter with reference to the accompanying drawings, FIG. 1 through FIG. 4.

Figure 1:
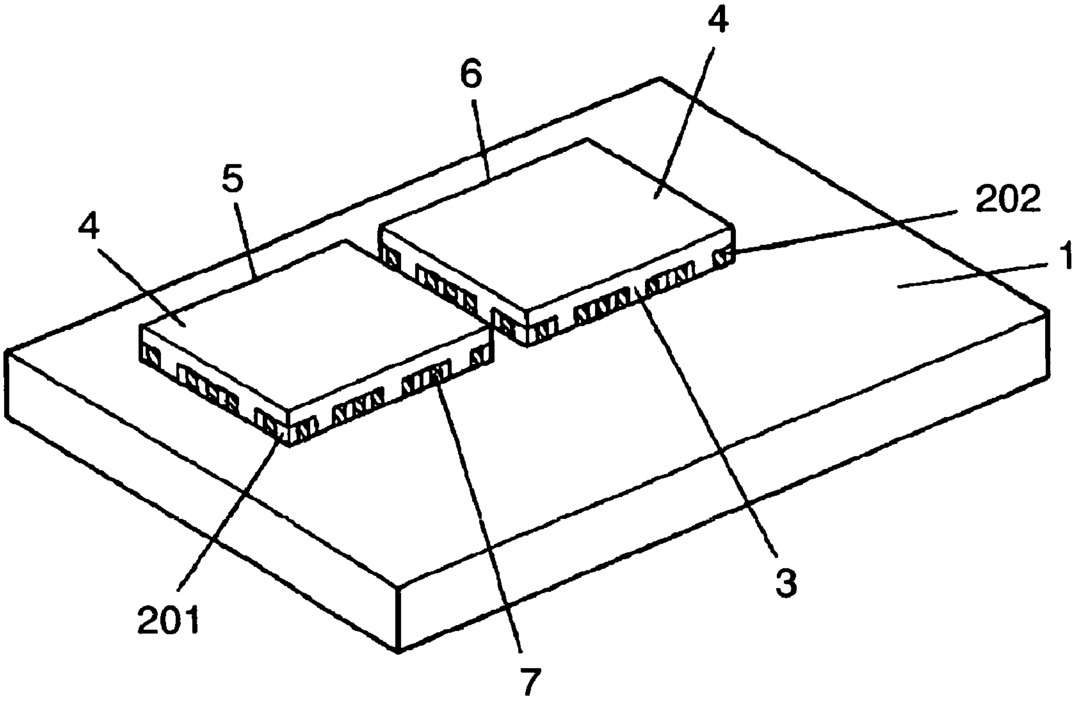
FIG. 1 is a perspective view of a high-frequency module of an exemplary embodiment of the present invention.

FIG. 1 is a perspective view of high-frequency module 100 of an exemplary embodiment of the present invention. High-frequency module 100 of the present invention contains first high-frequency circuit 5 and second high-frequency circuit 6.

In first high-frequency circuit 5 of the present invention, mixing circuit 12 and first filter circuit 16 are mounted on first circuit board 201, and over which, metallic case 4 is fixed to cover them.

Figure 2:
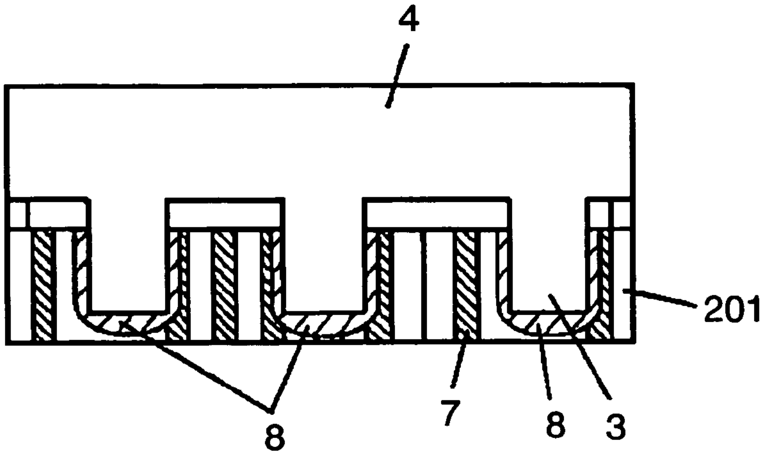
FIG. 2 is an enlarged side view of the high-frequency module of the exemplary embodiment.

FIG. 2 shows an enlarged side view of high-frequency module 100. Edge electrode 7 is formed at the side of first circuit board 201. In the structure, high-frequency noise is shielded by electrically connecting between the GND electrode of edge electrode 7 and terminal 3 formed on metallic case 4 with solder 8.

On the other hand, in second high-frequency circuit 6 shown in FIG. 1, the second filter circuit is mounted on second circuit board 202. Like first high-frequency circuit 5, metallic case 4 covers components of the filter circuit.

Figure 3:
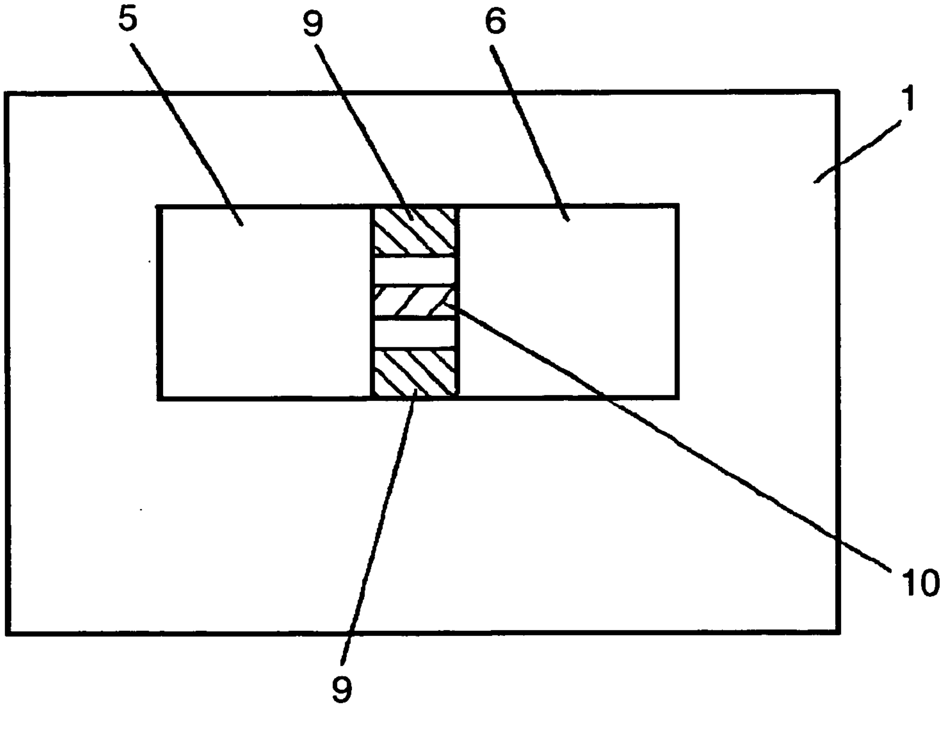
FIG. 3 is a top view of the high-frequency module of the exemplary embodiment.

As shown in FIG. 3, which is a top view of the structure of high-frequency module 100, first high-frequency circuit 5 and second high-frequency circuit 6 are mounted on motherboard 1. The high-frequency circuit of the present invention is configured by establishing a high-frequency connection between the two circuits through signal line 10 on motherboard 1.

The connecting line has an impedance of 50 ohm. GND pattern 9 is formed around the signal line to protect the signal line from an effect of noise, whereby the characteristics of the high-frequency module is maintained.

Figure 4:
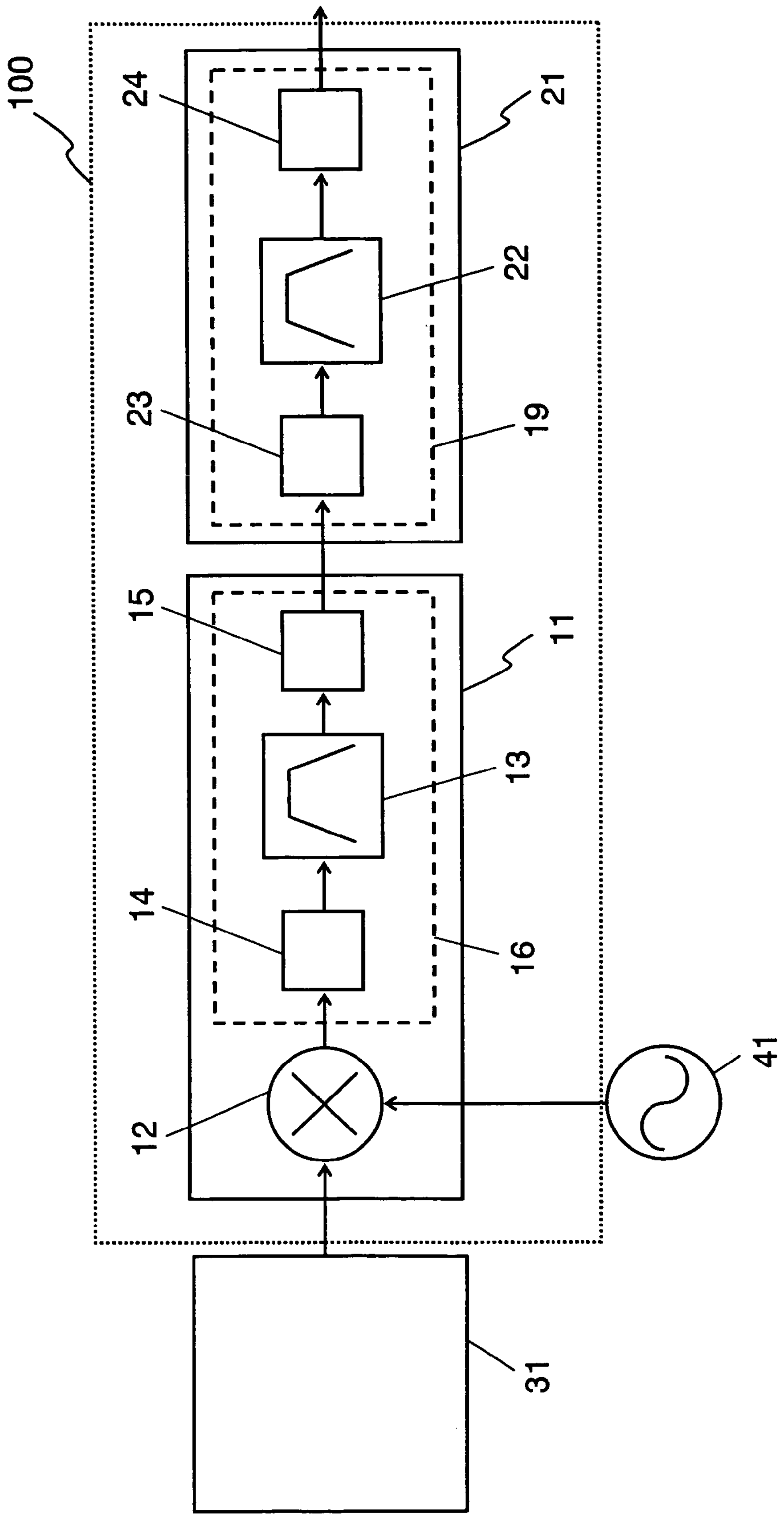
FIG. 4 is a circuit diagram of the high-frequency module of the exemplary embodiment.

Now will be described how the high-frequency circuit of the present invention works, with reference to FIG. 4.

Base band section 31 outputs a 380 MHz base band signal; on the other hand, oscillator 41 outputs a 1760 MHz local signal. The two signals are added at mixer 12 to be resultant output of 2140 MHz. The resultant signal passes through matching device 14 of first filter circuit 16 and enters into first filter 13. First filter 13 is a dielectric filter, which can substantially eliminate noise of a local signal, thereby attenuating the 1760 MHz spurious signal fed from mixer 12 by 50 dB to feed the signal to matching device 15. In the structure, matching device 14 is located to the input side of first filter 13; on the other hand, matching device 15 is located to the output side of first filter 13. Such an arrangement decreases radiation caused by unmatched impedance. As a result, the spurious signal, which is fed from the input side of matching device 14 and, without passing through first filter 13, fed into matching device 15, is attenuated more than 60 dB. That is, first filter circuit 16 can constantly keep 50 dB attenuation.

Besides, as described above, covering first high-frequency circuit 11 with metallic case 4 can suppress the spurious signal fed from the circuit.

Next, the output signal from matching device 15 goes into matching device 23, which forms second filter circuit 19 of second high-frequency circuit 21. Given impedance matching by matching device 23, the output signal is fed into second filter 22. Second filter 22 is a dielectric filter, which can substantially eliminate noise of a spurious signal, thereby attenuating the 1760 MHz spurious signal fed from mixer 12 by 50 dB to feed the signal to matching device 24.

In second high-frequency circuit 21, matching device 23 is located to the input side of second filter 22; on the other hand, matching device 24 is located to the output side of second filter 22. Such an arrangement decreases radiation caused by unmatched impedance. As a result, the spurious signal from the local signal, which is fed from matching device 23 and without passing through second filter 22, fed into matching device 24, is attenuated more than 60 dB. On the other hand, the spurious signal generated by the local signal fed into matching device 24 directly from matching device 14 of first high-frequency circuit 11, without traveling through first filter 13, matching devices 15 and 23, and second filter 22, is attenuated more than 110 dB. As a result, second filter circuit 19 can constantly keep 50 dB attenuation.

With the structure of first high-frequency circuit 11 and second high-frequency circuit 21, a desired amount of attenuation, i.e., 100 dB attenuation of the spurious signal can be achieved.

Although the explanation above introduces the structure in which high-frequency module 100 employs a matching device, it is not limited thereto; an amplifier and an isolator can be used with the matching device to obtain the similar effect.

Although the explanation above introduces a structure employing a single mixer, it is not limited thereto; a structure having two or more mixers can provide the similar effect.

Although the explanation above introduces a structure employing dielectric filters for filter 13 and filter 22, it is not limited thereto; a high-frequency module employing filters with an excellent quality in eliminating noise, such as a surface acoustic wave (SAW) filter and a MEMS filter, can provide the similar effect.

Although the explanation above introduces a structure employing two filters, it is not limited thereto; a high-frequency module having three or more filters can provide the similar effect.

Although the explanation above introduces a structure employing two high-frequency circuits, it is not limited thereto; a structure having three or more circuits can provide the similar effect.

Although the explanation above introduces a structure in which a base band signal fed from base band section 31 has a frequency of 380 MHz, and a local signal has a frequency of 1760 MHz, it is not limited thereto; a structure in which a local signal has a frequency ranging from 1730 to 1790 MHz can provide the similar effect.

Although the explanation above introduces a structure in which a base band signal fed from base band section 31 has a frequency of 380 MHz, and a local signal has a frequency of 1760 MHz, it is not limited thereto; a structure in which a base band signal has a frequency ranging from 10 to 400 MHz can provide the similar effect.

In the embodiment high-frequency circuit is covered with metallic case in order to suppress the spurious signal fed from the circuit. Instead of the metallic case, a conductive case formed of (a) an insulating resin for covering the circuits and (b) metal plating for covering a surface of the insulating resin can be also used.

Figure 5:
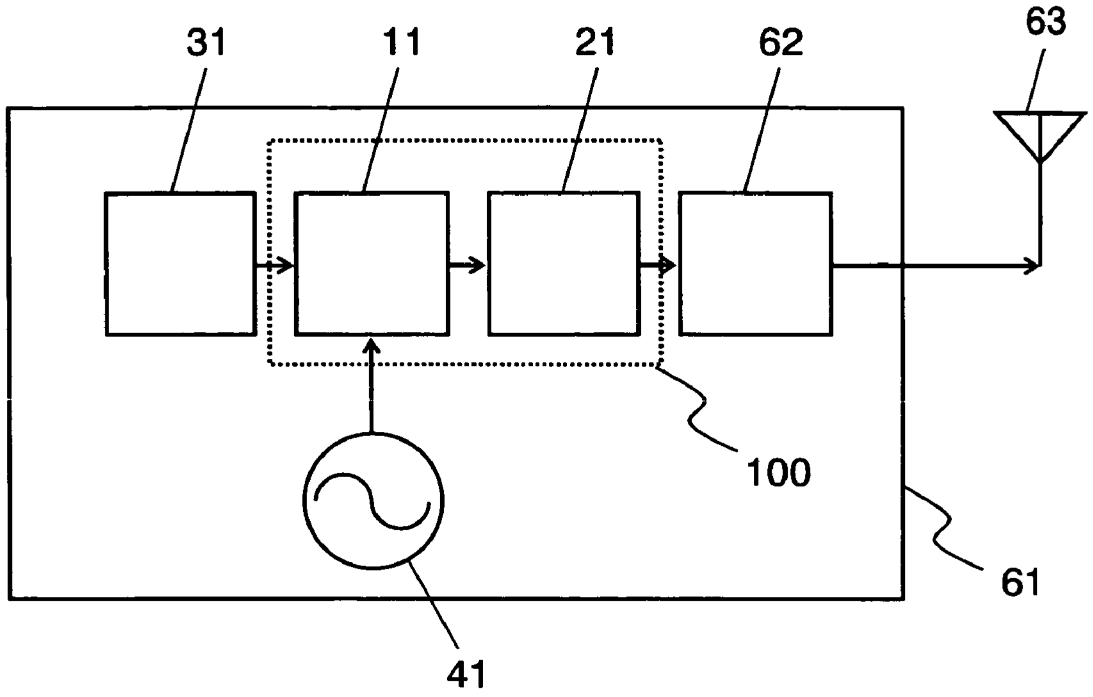
FIG. 5 is a general block diagram of a wireless device employing the high-frequency module of the present invention.
Figure 6:
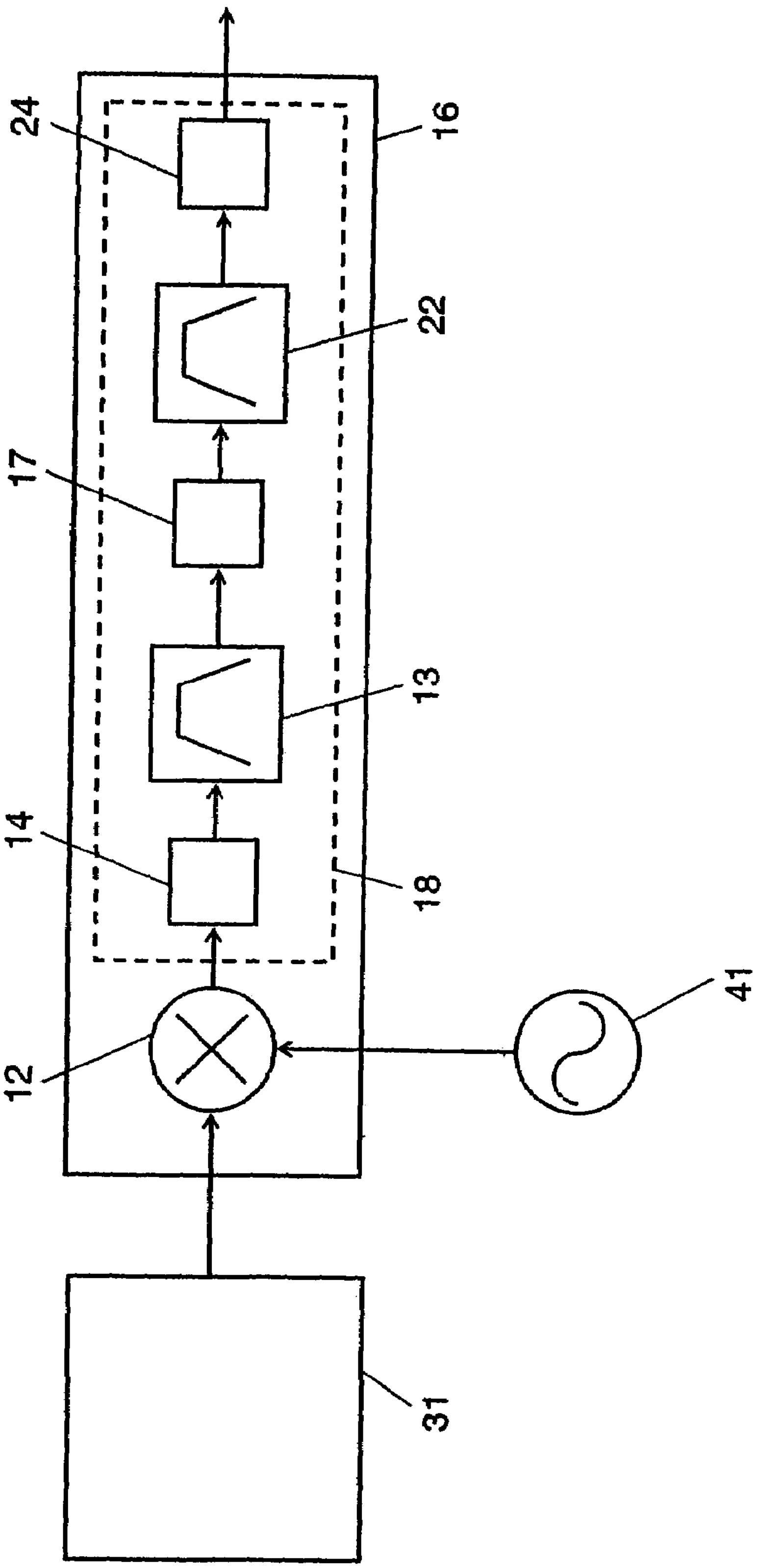
FIG. 6 PRIOR ART
FIG. 6 is a block diagram of a conventional high-frequency module.

FIG. 5 shows wireless device 61 employing high-frequency module 100 of the present invention. In the structure, a base band signal fed from base band section 31 and a local signal fed from oscillator 41 are fed into first high-frequency circuit 11 to have frequency conversion. The signal from circuit 11 passes through second high-frequency circuit 21 and front-end section 62 and goes out from antenna 63 into the air. The wireless device employing high-frequency module 100 of the present invention is highly effective in attenuating a spurious signal, accordingly, the spurious signal radiated from antenna 63 is preferably suppressed. The wireless device capable of suppressing a spurious signal to a low level can thus be obtained.

INDUSTRIAL APPLICABILITY

According to the structure of the present invention, as described above, the high-frequency circuit is divided into two sections: a first high-frequency circuit having a first filter circuit, and a second high-frequency circuit having a second filter circuit. With the structure, a high-frequency module capable of suppressing the output of a spurious signal can be obtained.

The invention claimed is:

1. A high-frequency module comprising:

a) a first circuit board having a first high-frequency circuit thereon, the first high-frequency circuit including:
   a-1) a mixing circuit for mixing a base band signal fed from a base band section with a local signal fed from an oscillator; and
   a-2) a first filter circuit for attenuating a local leak from the mixing circuit; and
b) a second circuit board having a second high-frequency circuit thereon, the second high-frequency circuit containing a second filter circuit for attenuating a local leak from the first filter circuit;
c) a motherboard having the first circuit board and the second circuit board formed on the same face thereon, wherein both the first circuit board and the second circuit board are covered with a conductive case.

2. The high-frequency module of claim 1, wherein the conductive case is made of metal.

3. The high-frequency module of claim 1, wherein the conductive case is formed of i) an insulating resin for covering the circuits, and ii) metal plating for covering a surface of the insulating resin.

4. The high-frequency module of claim 1, wherein the first filter circuit and the second filter circuit include a dielectric filter.

5. The high-frequency module of claim 1, wherein a signal line with an impedance of 50 Ω connects between the first high-frequency circuit and the second high-frequency circuit.

6. The high-frequency module of claim 1 wherein the motherboard comprises a signal line for inputting an output signal from the first filter circuit into the second filter and GND electrodes surrounding said signal line.

7. A wireless device employing a high-frequency module, the high-frequency module comprising:

a) a first circuit board having a first high-frequency circuit thereon, the first high-frequency circuit further including:
   a-1) a mixing circuit for mixing a base band signal fed from a base band section with a local signal fed from an oscillator; and
   a-2) a first filter circuit for attenuating a local leak from the mixing circuit; and
b) a second circuit board having a second high-frequency circuit thereon, the second high-frequency circuit containing a second filter circuit for attenuating a local leak from the first filter circuit;
c) a motherboard having the first circuit board and the second circuit board formed on the same face thereon, wherein both of the first circuit board and the second circuit board are covered with a conductive case.

8. The wireless device of claim 7, wherein the motherboard comprises a signal line for imputing an output signal from the first filter circuit into the second filter and GND electrodes surrounding said signal line.

* * * * *